July 10, 1923.
P. EBELING
1,461,416
APPARATUS FOR THE MANUFACTURE OF GLASSWARE
Filed Sept. 9, 1921
3 Sheets-Sheet 1
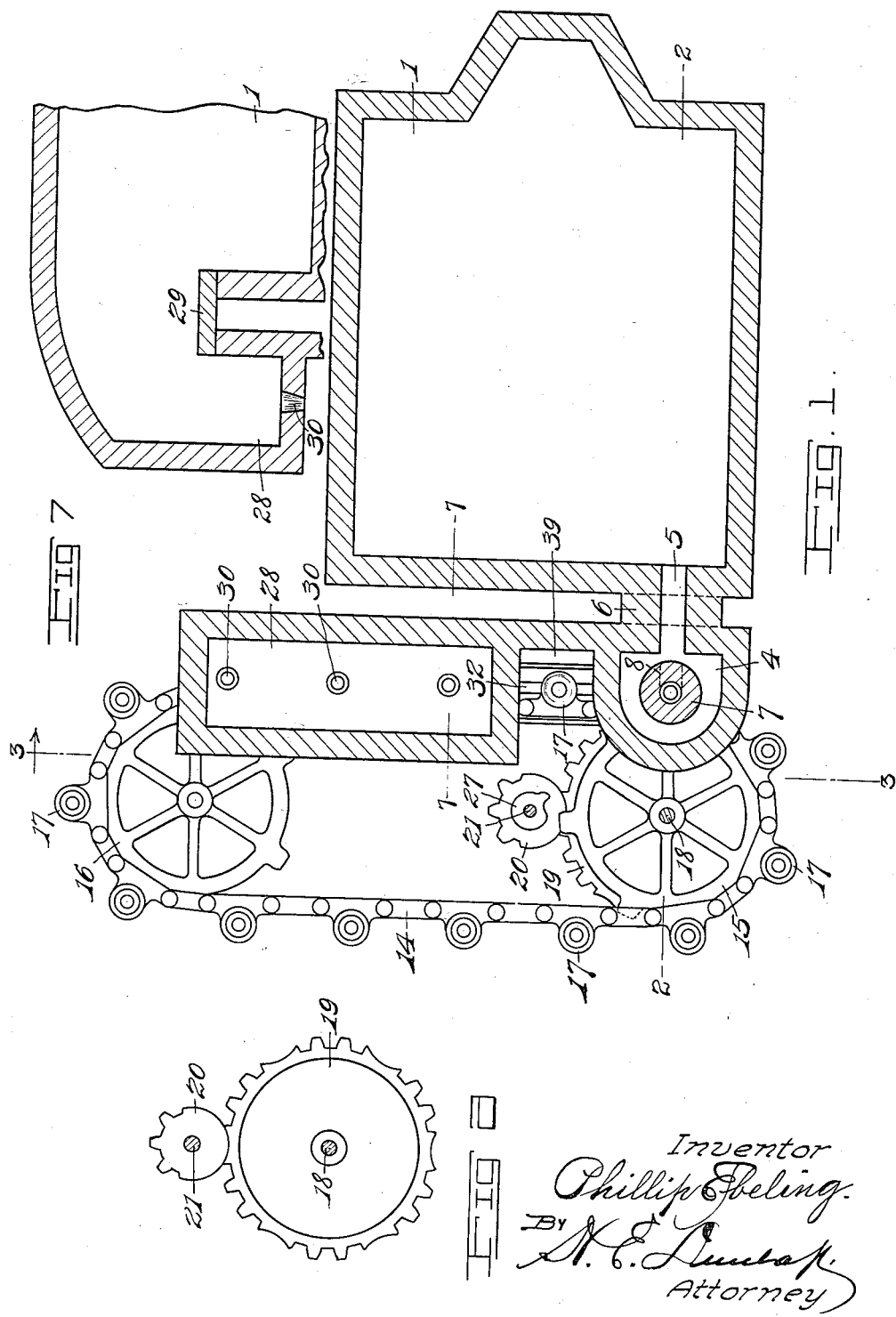

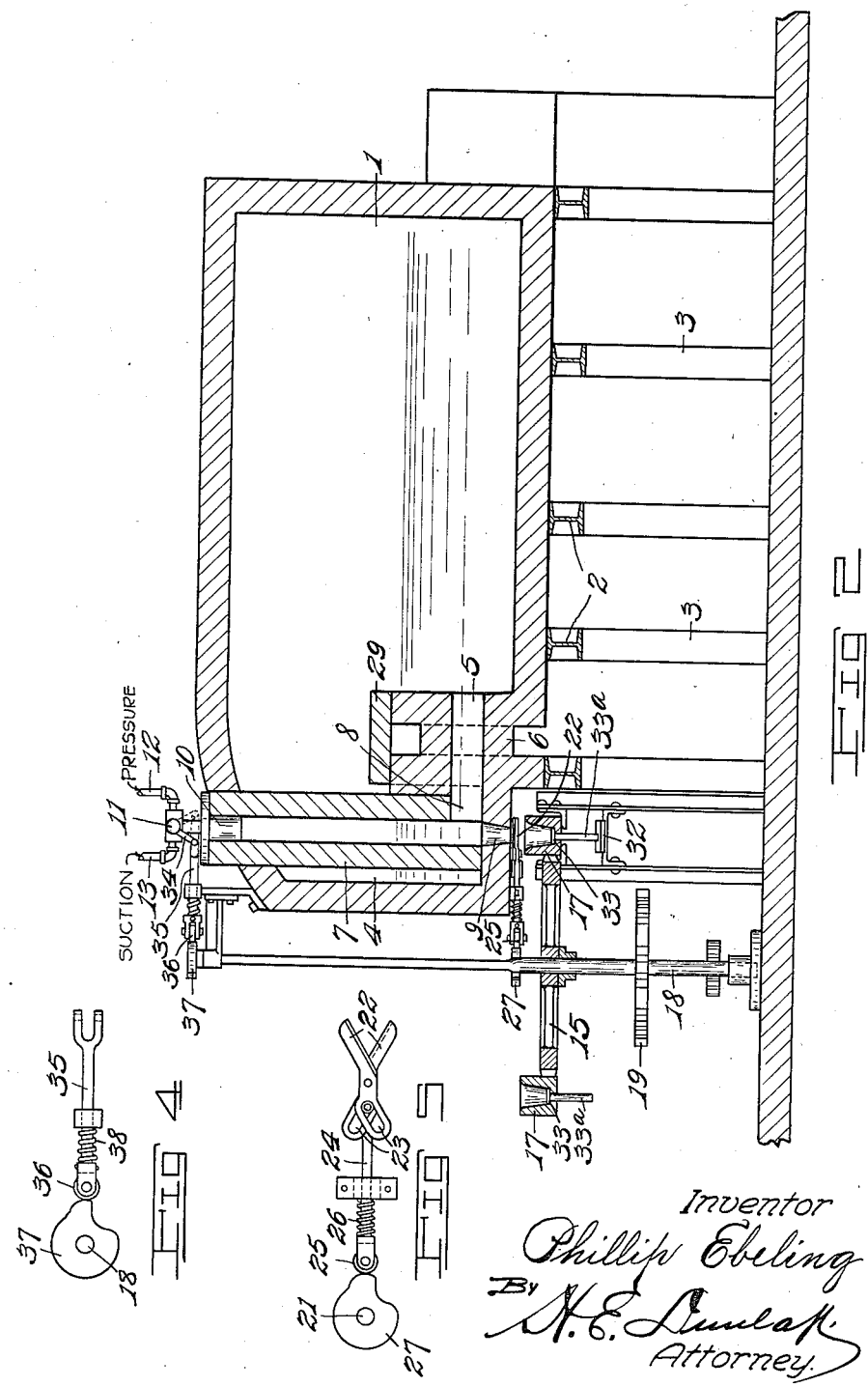

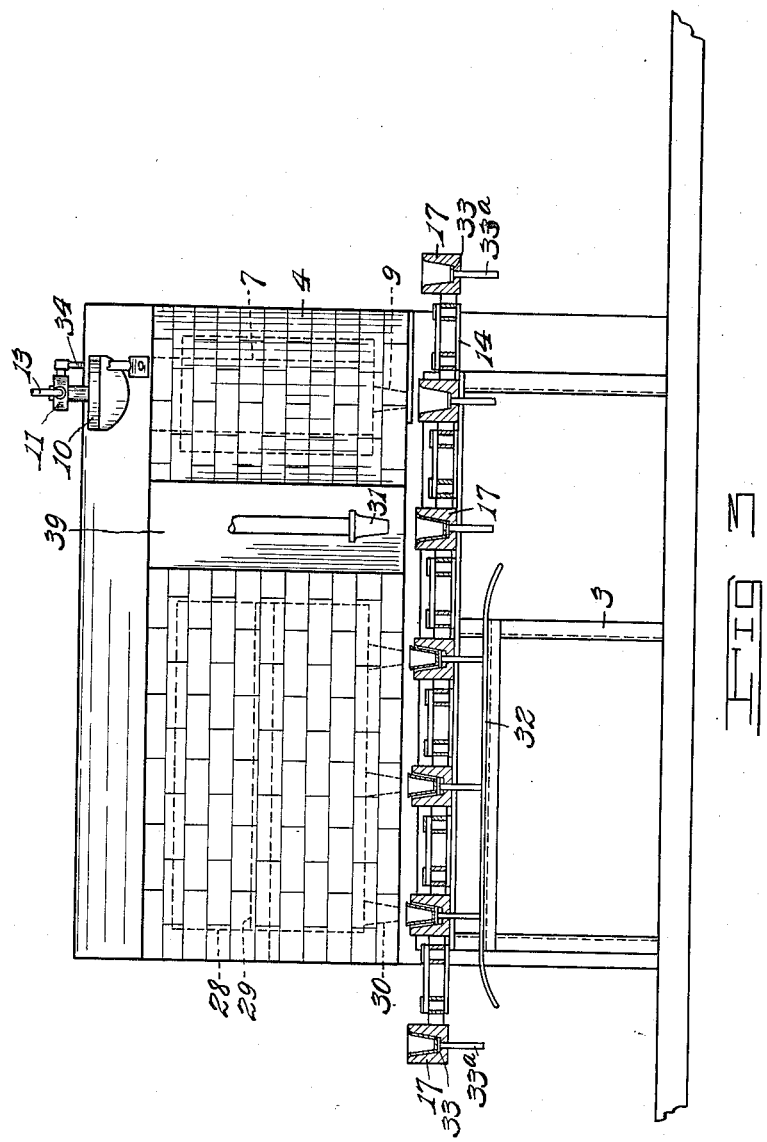

Patented July 10, 1923.

1,461,416

UNITED STATES PATENT OFFICE.

PHILLIP EBELING, OF BELLAIRE, OHIO.

APPARATUS FOR THE MANUFACTURE OF GLASSWARE.

Application filed September 9, 1921. Serial No. 499,484.

*To all whom it may concern:*

Be it known that I, PHILLIP EBELING, a citizen of the United States of America, and resident of Bellaire, county of Belmont, and State of Ohio, have invented certain new and useful Improvements in Apparatus for the Manufacture of Glassware, of which the following is a specification.

This invention relates broadly to glass furnaces, and it has for its primary object to provide a glass melting tank having a fire-polishing chamber located adjacent thereto and receiving heat directly therefrom, whereby heat employed in melting the glass is also utilized for fire-polishing ware, resulting not only in a substantial economy in fuel being effected, but also in a material saving of expense ordinarily involved in the construction and maintenance of auxiliary heating, or fire-polishing, furnaces. A further advantage resulting from the aforesaid arrangement of the fire-polishing chamber in such manner as to receive its heat directly from the melting tank is that the fire-polishing is effected by heat from any character of fuel used for melting the glass, whereas in separate polishing furnaces, as heretofore used, it is possible to employ only very clean gas or oil as fuel.

A further object of the invention is to provide, in association with a glass melting tank, mechanisms whereby molten glass from the tank is supplied to ware-forming molds, the glass so supplied is pressed into shape in such molds, and the ware so formed is finally subjected to fire-polishing blasts, said mechanism being wholly automatic in that human intervention is required only to effect transfer of the ware to the annealing lehr following the fire-polishing operation. Or, instead of the glass being pressed into ware-form in said molds, it may be pressed into blanks which, following the reheating to which they are subjected in the fire-polishing operation, may be blown into ware form in the usual or any preferred manner.

A still further object is to provide means whereby the fire-polishing of ware is effected promptly following the pressing operation and without removal of the ware from the mold, thus not only eliminating the necessity for allowing the ware to cool to a condition permitting handling without distortion, which is presented where the ware must be transferred from the mold, but also facilitating the fire-polishing operation in that the ware retains much of its original heat and is still more or less plastic when the polishing station or stations are reached and, consequently, requires but little reheating at such stations.

Another object within the contemplation of the invention is to provide novel and improved means for supplying glass to the ware-forming molds in predetermined quantities and at regularly timed intervals.

With these and other important objects in view, the invention resides in the features of construction, arrangement of parts and combinations of elements which will hereinafter be exemplified, reference being had to the accompanying drawings, in which—

Figure 1 is a horizontal section of the invention;

Figure 2 is a longitudinal section of the same on line 2—2, Fig. 1;

Figure 3 is a sectional elevation on line 3—3, Fig. 1;

Figure 4 is an enlarged top plan view of a portion of the air-control means of the glass flowing or feeding device;

Figure 5 is a similar view of the shearing mechanism;

Figure 6 is an enlarged view of the intermittent drive gears; and—

Figure 7 is a section on line 7—7, Fig. 1.

Referring to said drawings, 1 indicates a glass melting tank which is supported at a suitable elevation, as upon I-beams 2 carried by upright posts or girders 3. Located closely adjacent to and rearward of said tank, preferably adjacent to a corner of the latter is a small reservoir 4, herein shown as approximately cylindrical in horizontal section, into the lower end of which molten glass from the tank flows through a throat 5 provided in a horizontal neck-like wall 6 which connects said reservoir to said tank.

Disposed within said reservoir 4 is an upright hollow column 7 formed of a suitable refractory material, having an inlet passage 8 at or adjacent to its lower end through which glass from the reservoir may freely enter and rise to the level of the glass in the tank and in the reservoir. A discharge port 9 is provided in the bottom of the reservoir in alinement with the internal bore of said column 7.

Closing the upper end of the column, which projects upward through the top of the tank, is a cap or closure 10 which is surmounted by a two-way valve 11. Connected to said valve are two pipes 12 and 13, the former located in an air pressure line and the latter in an air suction line. Upon shifting the movable member of said valve to one position, air pressure is admitted through the pipe 12 to the interior of the column for ejecting through the discharge port 9 a quantity of the glass contained by the latter; and, upon shifting said valve in the opposite direction, said air pressure is shut off and the valve is opened to the suction in the suction line 13, whereby unsevered glass extruded through the port 9 is drawn back into said interior. The operation of said valve 11 to the positions mentioned is effected alternately, as will hereinafter be explained.

The reservoir 4 has the upper portion thereof, or the major part of that portion which is located above the high level of the glass, in open communication with the interior of the tank, thus permitting the heat of the latter to act within the reservoir about the column 7 for maintaining the molten condition of the glass admitted through the throat 5.

Located adjacent to the rear end of the tank 1 so that it operates beneath the reservoir is an endless carrier, herein shown as consisting of a sprocket chain 14 carried by horizontally disposed sprocket wheels 15 and 16. Suitably supported by said carrier chain 14 at regularly spaced intervals are molds 17. The sprocket wheel 15 is carried by an upright shaft 18 which is driven intermittently, as by gearing of intermittent or Geneva type, for successively positioning said molds 17 throughout a definite interval of time for receiving charges of glass discharged, as aforesaid, through the port 9. As herein shown for illustrative purposes, said intermittent gearing comprises a driven gear 19 fixed on the shaft 18 and a driving gear 20 mounted on a suitably driven countershaft 21, said driving gear being adapted in each revolution to move the driven gear throughout that portion of a revolution necessary to advance the chain the distance between adjacent molds, and said gears being of such relative diameters as to allow the required period of rest between successive movements of the chain.

A shear for severing charges of glass for delivery to the molds is provided adjacent to the discharge port 9. While said shear may be of any preferred form, that herein shown comprises pivoted blades 22 arranged adjacent to said port and adapted for actuation at definite intervals for shearing the glass extruded from said port. Slots 23 provided in the crossed rear ends of said blades have received for movement therein an anti-friction roller carried on the end of a rod 24 which is mounted for longitudinal movement. The outer end of said rod carries a roller 25 which is held by means of a spring 26 in engagement with a cam 27 on the countershaft 21, said cam being adapted to effect shifting of said rod for opening and closing said shears at definitely timed intervals.

Located adjacent to the rear end of the tank 1 at a suitably spaced distance from the reservoir 4 is a chamber 28 which is in open communication with said tank over the top of a bridge 29 disposed above the high level of glass in said tank so that heat from the latter is free to enter and circulate within said chamber. The bottom of said chamber is located slightly above the level of the tops of the molds 17 and has therein a plurality of ports 30 through which heat and flame for fire-polishing ware carried by said molds are directed. Said ports 30, of which three are herein shown, are spaced relatively to correspond with the relative spacing of the molds; but a continuous slot of suitable length may obviously be substituted for said ports.

It will be noted that the inner wall of the chamber 28 is spaced away from the tank wall so as to provide free access for air therebetween, thereby preventing the rapid deterioration from the effects of the heat which would result if a single wall were employed.

The charge of glass sheared off and deposited in a mold, as hereinbefore described, is pressed into ware form at the end of the next succeeding step in the travel of the carrier by means of the plunger 31 of a press which may be of any preferred type of construction and which occupies a position in the space or recess 39 provided therefor intermediate the reservoir 4 and the chamber 28. Such press must of course be operated at properly timed intervals, but since any of various commercial types of presses may be employed, I have shown in the drawings only a conventional form of press plunger.

Underlying the fire-polishing chamber 28 is a runway 32 having its opposite ends downwardly inclined. As each mold travels from the ware pressing or forming station to the first firing position, said runway is mounted by the depending stem 33$^a$ of a valve 33 seated in the bottom of the mold, and the article of ware is thereby elevated slightly, as shown in Fig. 1, so that it is freed from the mold walls to the extent that the fire-polishing heat directed downward thereon may play into direct encircling contact with the outer walls thereof. As the molds pass from beneath the chamber 28 the valve stems 33$^a$ ride off the runway and permit the ware to re-seat within the molds. Obviously, in so re-seating, any articles of ware which have become slightly distorted in form by excessive heating will thus be re-shaped. At a suitable point in the travel of the ware, as at the second or third station following the fire-polishing, the ware may be removed from the molds and immediately placed upon the usual annealing pans for introduction into the lehr. This transfer may be effected prior to any substantial loss of heat, with the manifest result that heat will be conserved in the lehr. Obviously, any one or more of the ports 30 may be closed if not required, and the runway 32 may be of any suitable length and disposed to elevate the ware only when such is required.

The movable member of the valve 11 carries an arm 34 to which is pivotally attached an end of a longitudinally shiftable rod 35 which carries a roller 36 upon its opposite end in engagement with a cam 37 mounted on the shaft 18. A spring 38 normally holds said rod in a retracted position in engagement with said cam, and the latter is shaped to provide for the requisite shifting movements whereby said valve is held closed, is opened to permit air pressure to enter the interior of the column 7, and is opened to permit suction to act within said column, all at definite times and for definite periods.

From the foregoing it will be understood that molten glass flows unobstructedly from the tank 1 through the throat 5 to the reservoir 4 and thence through the inlet passage 8 to the interior of the hollow column 7. At a definite time, the valve 11 is opened, admitting air pressure to the interior of said column whereby a quantity of glass is extruded through the discharge port 9, whereupon the shears 22 are actuated to sever from the extruded column a quantity of glass which drops into the underlying mold 17 of the endless intermittently-driven carrier and constitutes a ware-forming charge. Following the shearing off of the charge, the valve 11 is shifted to a position permitting suction to act within the column whereby the unsevered portion of the extruded glass is returned to the interior of the column. Also, the carrier is promptly actuated to advance a definite distance for positioning the charge mold in the space or recess 39. When so positioned, the plunger 31 of the press is actuated by any suitable means to reciprocate with respect to said mold for pressing the charge into ware form. Following the pressing operation, the ware is subjected to fire-polishing blasts of heat directed downward through the ports or passages 30 provided therefor in the chamber 28.

It will be manifest that the various operations described are in successive steps of predetermined duration, so that manual intervention up to the time that the ware is ready for annealing is wholly eliminated. Moreover, a material conservation of fuel is rendered possible by reason of the fact that the ware is fire-polished by heat previously utilized for effecting melting of the glass in the tank, and that the ware, being still in a semi-plastic condition when polishing position is reached, requires relatively little heat to effect its polishing.

While I have shown and described certain specific mechanisms for performing various steps necessary to the invention, it will be understood that various other mechanisms might be substituted for some of those so shown and described. I do not, therefore, limit myself beyond the necessary requirements of the terms employed in the appended claims.

What is claimed is—

1. The combination with a glass melting tank, of a ware-reheating chamber separated from said tank by a bridge wall and having open communication with and receiving heat from said tank.

2. The combination with a glass melting tank, of a ware-reheating chamber separated from said tank by a bridge wall and having open communication with and receiving heat from said tank, said chamber having openings through which heat is directed into contact with the ware.

3. The combination with a glass melting tank, of a ware-reheating chamber located adjacent to said tank and in open communication with the latter over a bridge disposed above the high level of the glass in the tank, said chamber being provided with means for directing heat into contact with the ware.

4. The combination with a glass melting tank, of ware-forming molds, an intermittently actuated carrier for said molds, automatic means for depositing charges of glass in said molds, means for pressing said mold charges into ware form, and means receiving heat from said tank for fire-polishing the formed articles of ware.

5. The combination with a glass melting tank, of a carrier, molds borne by said carrier, means for flowing glass from said tank, mechanism for severing mold charges from the flow located to permit the severed charges to be deposited by gravity in said molds, and means for pressing said charges in said molds, and means receiving heat from said tank for reheating said pressed charges.

6. The combination with a glass melting tank, of an intermittently actuated carrier, molds borne by said carrier, automatic means for flowing glass from said tank, shearing mechanism arranged to sever charges from the flow for deposit in the molds, means cooperating with said molds for pressing said charges into ware form, and means for fire-polishing the ware prior to transfer of the latter from the molds.

7. The combination with a glass melting tank, of an intermittently actuated carrier, molds borne by said carrier, automatic means for flowing glass from said tank, shearing mechanism arranged to sever charges from the flow for deposit in the molds, means cooperating with said molds for pressing said charges into ware form, means whereby elevation of the ware in the molds is effected, and means for fire-polishing said ware while the latter is in elevated position.

8. The combination with a glass melting tank, of an intermittently actuated carrier, molds borne by said carrier, automatic means for flowing glass from said tank, shearing mechanism arranged to sever charges from the flow for deposit in the molds, means cooperating with said molds for pressing said charges into ware form, and means in open communication with and receiving heat from the tank whereby fire-polishing of the ware is effected while the latter remains within the molds.

9. The combination with a glass melting tank, of an intermittently actuated carrier, molds borne by said carrier, automatic means for flowing glass from said tank, shearing mechanism arranged to sever charges from the flow for deposit in the molds, means cooperating with said molds for pressing said charges into ware form, valves in the bottoms of said molds, means whereby said valves are raised for elevating the ware within the molds, and means for reheating the ware while the latter occupies elevated position, said valve-elevating means being adapted to permit said valves to lower for reheating the ware in the molds prior to cooling.

10. The combination with a glass melting tank, of an intermittently actuated carrier, molds borne by said carrier, automatic means for flowing glass from said tank, shearing mechanism arranged to sever charges from the flow for deposit in the molds, means cooperating with said molds for pressing said charges into ware form, valves in the bottoms of said molds, means whereby said valves are raised for elevating the ware within the molds, and means for reheating the ware while the latter occupies elevated position, said reheating means embodying openings through which heat from the tank is directed upon the ware.

11. The combination with a glass melting tank, of an intermittently actuated carrier, molds borne by said carrier, automatic means for flowing glass from said tank, shearing mechanism arranged to sever charges from the flow for deposit in the molds, means cooperating with said molds for pressing said charges into ware form, valves in the bottoms of said molds, means whereby said valves are raised for elevating the ware within the molds, and means for reheating the ware while the latter occupies elevated position, said reheating means embodying a chamber located over the path of travel of said molds following the ware-forming operation, said chamber being in open communication with and receiving heat from said tank and having ports through which heat is directed upon the ware.

12. The combination with a glass melting tank, of a reservoir located adjacent to said tank, a conduit through which glass flows from said tank to said reservoir, a hollow column in said reservoir having open communication with the latter adjacent to its lower end, an air pressure line and a suction line associated with the upper end of said column, and a valve adapted to be operated alternately to admit pressure from said pressure line to said column and to permit the suction of said suction line to act within said column, said reservoir having a discharge port, molds for receiving charges of glass extruded through said discharge port, means for pressing said charges in said molds, and means for reheating the pressed charges.

13. The combination with a glass melting tank, of a carrier, molds borne by said carrier, automatic means for flowing glass from said tank and depositing charges of predetermined mass within said molds, means cooperating with said molds for pressing said charges into predetermined form, and means receiving heat from said tank for reheating said formed charges while the latter remain within the molds.

14. The combination with a glass melting tank, of a carrier, molds borne by said carrier, automatic means for flowing glass from said tank and depositing charges of predetermined mass within said molds, means cooperating with said molds for pressing said charges into predetermined form, and means for reheating said formed charges while the latter remain within the molds, said reheating means embodying openings through which heat from the tank is directed into contact with the formed charges.

15. The combination with a glass melting tank, of a carrier, molds borne by said carrier, automatic means for flowing glass from said tank and depositing charges of predetermined mass within said molds, means cooperating with said molds for pressing said charges into predetermined form, means for reheating said formed charges while the latter remain within the molds, said reheating means embodying openings through which heat from the tank is directed into contact with the formed charges, and means whereby said charges are slightly elevated during reheating.

16. The combination with a glass melting tank, of a carrier, molds borne by said carrier, automatic means for flowing glass from said tank and depositing charges of predetermined mass within said molds, means cooperating with said molds for pressing said charges into ware form, and means for directing heat from the furnace upon the ware for reheating the latter prior to removal from the molds.

17. The combination with a glass melting tank, of a carrier, molds borne by said carrier, automatic means for flowing glass from said tank and depositing charges of predetermined mass within said molds, means cooperating with said molds for pressing said charges into ware form, means for directing heat from the furnace upon the ware for reheating the latter prior to removal from the molds, and means for elevating the ware within the molds during the reheating.

18. The combination with a glass melting tank, of a carrier, molds borne by said carrier, automatic means for flowing glass from said tank and depositing charges of predetermined mass within said molds, means cooperating with said molds for pressing said charges into ware form, a fire-polishing chamber located adjacent to and receiving heat directly from the tank and located over the path of travel of the molds following the pressing operation, said chamber having passages through which heat is directed upon the ware for polishing the latter prior to removal from the molds.

19. The combination with a glass melting tank, of a carrier, molds borne by said carrier, automatic means for flowing glass from said tank and depositing charges of predetermined mass within said molds, means cooperating with said molds for pressing said charges into ware form, a fire-polishing chamber located adjacent to and receiving heat directly from the tank and located over the path of travel of the molds following the pressing operation, said chamber having passages through which heat is directed upon the ware for polishing the latter prior to removal from the molds, and means for elevating the ware during the polishing operation.

20. The combination with a glass melting tank, of a carrier, molds borne by said carrier, automatic means for flowing glass from said tank and depositing charges of predetermined mass within said molds, means cooperating with said molds for pressing said charges into ware form, a fire-polishing chamber located adjacent to and receiving heat directly from the tank and located over the path of travel of the molds following the pressing operation, said chamber having passages through which heat is directed upon the ware for polishing the latter prior to removal from the molds, and means whereby automatic elevation of the ware out of contact with the mold walls is effected during the polishing operation.

21. The combination with a melting tank, of traveling glass molds, means cooperating with said molds for pressing blanks, a reheating chamber receiving heat from said tank and located over the path of travel of said molds, and means for elevating said blanks with respect to said molds into a position in which they are subjected to reheating from the heat of said chamber.

In testimony whereof, I affix my signature in presence of two subscribing witnesses.

PHILLIP EBELING.

Witnesses:
W. F. KEEFER,
H. E. DUNLOP.